Oct. 31, 1933.    V. J. CHAPMAN    1,932,924
ARC WELDING
Filed Jan. 23, 1932

Inventor:
Verni J. Chapman,
by Charles V. Mullan
His Attorney.

Patented Oct. 31, 1933

1,932,924

UNITED STATES PATENT OFFICE 1,932,924

ARC WELDING

Verni J. Chapman, Schenectady, N. Y., assignor to General Electric Company, a corporation of New York Application January 23, 1932. Serial No. 588,364

6 Claims. (Cl. 219—8)

My invention relates to arc welding, and particularly to arc welding machines for automatically feeding heavily coated welding electrodes toward and away from the work to strike and thereafter maintain a welding arc.

In order to improve their arcing characteristics as well as the quality of the weld metal, welding electrodes are often coated with materials called fluxes. Very often these coatings are of considerable thickness and electrically insulate the electrodes rendering them unsuited for use in automatic machines in which the welding current is fed to the surface of the electrode at a predetermined point as it is fed through the machine to the work. Heavy coated electrodes are generally supplied in short lengths with one end thereof bared for insertion in a holder by means of which current is fed to the electrode and the electrode fed to the work.

It is an object of my invention to provide a welding machine for feeding heavily coated welding electrodes of considerable length into and out of engagement with the work to strike and thereafter maintain an arc and for supplying welding current to said electrodes as they are fed to the work.

It is a further object of my invention to provide means for removing a portion of the coating of coated electrodes and conducting welding current thereto through the portion of the electrode thus exposed.

Figure 1:
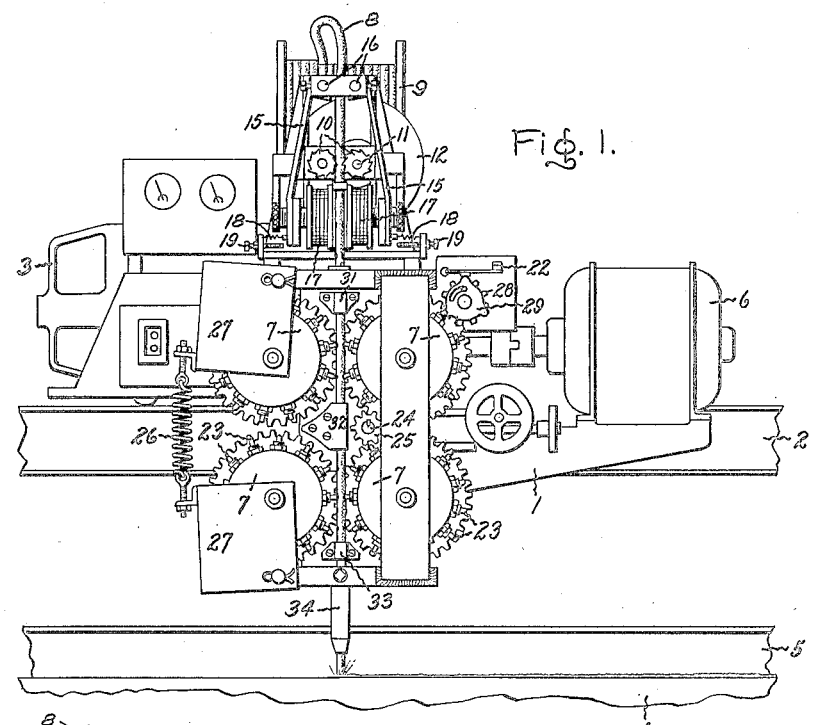
Figure 2:
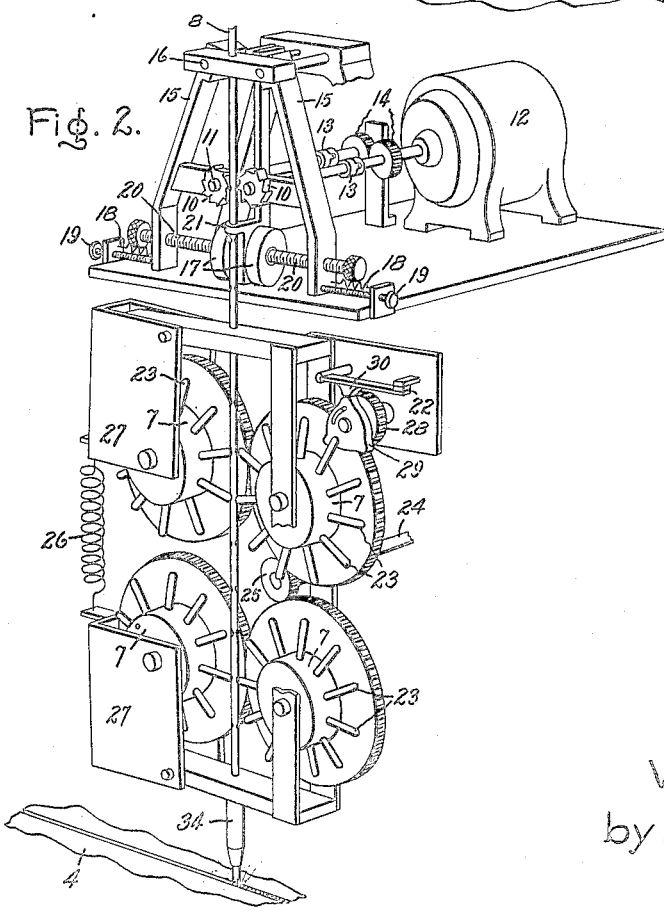
Figure 3:
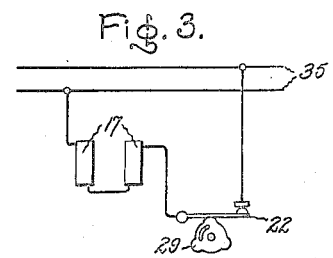

Further objects of my invention will become apparent from the following description taken in connection with the accompanying drawing in which Fig. 1 is a partial view of an automatic arc welding machine embodying one form of my invention; Fig. 2 a distorted perspective view illustrating the arrangement of parts of Fig. 1, and Fig. 3 a diagrammatic illustration of the switching means employed in Figs. 1 and 2.

In Fig. 1 the welding head is mounted upon a carriage 1 supported on a track 2 along which it is propelled by a traversing motor 3 to perform a welding operation on work 4 which is held in the machine by a clamp a portion of which is shown at 5. The welding head comprises a feed motor 6 by means of which feed rolls 7 are rotated in the proper direction and at the proper speed to feed an electrode 8 from a reel 9 toward and from the work 4 to strike and thereafter maintain a welding arc. In automatic machines the operation of the feed motor 6, or a transmission connecting the feed motor with the feed rolls, is made to function in accordance with a characteristic of the welding arc to control the speed and direction of electrode feed.

In the particular arrangement illustrated, the feed rolls 7 are provided with projections and will hereinafter be referred to as sprocket wheels. Welding current is fed to the electrode through these projections which engage those portions of the electrode from which the insulating coating has been removed by suitable means. The flux removing means may be a grinding wheel, a saw, a milling cutter, or the like, so long as it is adapted to remove a portion of the coating from the electrode. In the particular instance illustrated milling cutters 10 have been employed. These cutters are mounted on movable shafts 11 connected to a motor 12 through flexible couplings 13 and spur gears 14. The bearings of shafts 11 are mounted in swinging arms 15 pivoted at 16, the lower ends of which act as armatures and are drawn toward the electrode 8 by magnets 17 when these magnets are energized. Arms 15 are normally biased outwardly by springs 18 to a distance determined by the setting of screws 19. The air gaps between arms 15 and magnets 17 are controlled by threaded cores 20 which can be adjusted to regulate the penetration of the cutters into the electrode 8. This adjustment should be such that the flux is completely removed from the electrode which is held in proper position relative to the cutters by a guide 21.

In the arrangement illustrated the cutting means is periodically moved into engagement with the electrode by energizing magnets 17 through a switch 22 which is periodically closed to synchronize the operation of the cutting means with the periodic engagement of the projections 23 of the sprocket wheels 7 with the electrode, so that the portions exposed on the electrode by the cutting means are in registry with the projections on the sprocket wheels. In the particular instance illustrated, the sprocket wheels 7 are driven by the motor 6 through a shaft 24 provided with a gear 25 which meshes with gears attached to the sprocket wheels 7. Two of the four gears and sprocket wheels employed in the machine illustrated are movably supported and are forced into engagement with the fixed gears and the electrode by a spring 26 attached to the housings 27 in which they are mounted. Meshing with one of the fixed sprocket wheels 7 is a gear wheel 28 on the shaft of which there is an adjustable cam 29. The cam 29 makes contact with a cam follower 30 attached to switch 22 and rotation of cam 29 periodically operates this switch. With the proper adjustment of cam 29 relative to gear 28 the number of teeth on this gear bears such a relationship to the number of teeth on the sprocket wheel gear with which it is meshing that switch 22 is operated at the proper time to advance the cutters 10 into engagement with the electrode to remove its coating at points separated from one another a distance equal to the pitch or distance between the electrode engaging portions of the projections 23 on the sprocket wheels 7 and in registry therewith.

The welding electrode is held in proper position relative to the sprocket wheels 7 by guides 31, 32 and 33 and fed to the work through a nozzle 34.

The apparatus above described is insulated from the welding carriage in order to prevent short circuit of the arc through the machine. It is not necessary to insulate the flux removing means from the machine if the cutters are properly insulated. In some instances, it will not be necessary to insulate these cutters since they will themselves be made of an insulating material. For example, it is not necessary to insulate certain types of grinding wheels which are themselves made of an insulating material.

The operation of the apparatus above described is as follows:—The electrode 8 is withdrawn from reel 9 by sprocket wheels 7 and fed toward the work through nozzle 34. As it is fed past the cutting means 10, portions of this coating thereof are removed to bare the electrode so that current may be conducted thereto through projections 23 of the sprocket wheels 7. The operation of the cutting means 10 is under the control of magnets 17 which are periodically energized from a source of supply 35 through a switch 22 which is under the control of cam 29, the arrangement being shown diagrammatically in Fig. 3. When the magnets 17 are energized the cutting means is forced into engagement with the electrode and when these magnets are deenergized the cutting means is moved to an inoperative position through the agency of springs 18. The energization of magnets 17 is synchronized with the rotation of the sprocket wheels 7 to remove the flux coating from the electrode at points separate from one another a distance equal to the pitch of the projections 23 on the sprocket wheels. This synchronization is obtained through the gearing above described and adjustment of the cam 29 relative to gear 28.

The particular embodiment above illustrated and described may be variously modified without departing from my invention. Other means may be provided for supplying current to the bared portions of the electrode in place of the sprocket wheels 7 and the means for supplying the current may be separate and distinct from the means employed for feeding the electrode toward and away from the work. Likewise variously modified flux removing means may be employed for exposing the electrode so that the current conducting means may come in contact therewith.

In the particular arrangement illustrated the mechanisms for removing the flux and for conducting welding current into the electrode are in the nature of attachments which can be associated with automatic arc welding machines adapted for feeding bared electrode wire in order to render them suitable for feeding heavily fluxed electrode material. It is of course apparent that these means may form an integral part of the welding head and such modifications are contemplated.

What I claim as new and desire to secure by Letters Patent of the United States, is:

1. Arc welding apparatus comprising means for feeding a coated electrode toward and away from the work to strike and thereafter maintain a welding arc, means for removing a part of the coating from said electrode and means for conducting welding current into said electrode through the portion exposed by removing said coating.

2. Arc welding apparatus comprising means for feeding a coated electrode toward and away from the work to strike and thereafter maintain a welding arc, means for periodically removing a portion of said coating to expose said electrode, and means for conducting welding current into said electrode through said exposed portions.

3. Arc welding apparatus comprising means provided with projections for engaging an electrode, and means for intermittently removing a portion of the coating from a fluxed electrode to expose it at points separated from one another a distance equal to the pitch of the projections on said electrode engaging means and in registry with said projections.

4. Arc welding apparatus provided with means having projections for periodically engaging a welding electrode, means for removing a portion of the coating from a fluxed electrode to expose it at points separated from one another a distance equal to the pitch of the projections on said electrode engaging means and in registry with said projections, means for supplying current to said electrode through said electrode engaging means, and means for operating said electrode engaging means to feed the electrode toward and away from the work to strike and thereafter maintain a welding arc.

5. Arc welding apparatus comprising means for removing a portion of the coating from a coated welding electrode, means for periodically moving said coating removing means into engagement and out of engagement with a coated electrode, means provided with projections for engaging said electrode and conducting welding current thereto, means for synchronizing the operation of said means for moving the flux removing means into and out of engagement with said electrode to expose the electrode at points registering with the projections on said electrode engaging means, and means for operating said electrode engaging means to feed the electrode toward and away from the work to strike and thereafter maintain a welding arc.

6. Arc welding apparatus comprising a cutter for removing a portion of the coating from a coated welding electrode, means for operating said cutter, means including an electromagnet for periodically moving said cutter into engagement with said electrode, a sprocket wheel whose projections engage said electrode, switching means for controlling the energization of said electromagnet and for synchronizing the operation of said cutting means with the periodic engagement of the projections of said sprocket with said electrode to bare the electrode at points in registry with the projections on said sprocket wheel, means for supplying current to said electrode through said sprocket wheel, and means for rotating said sprocket wheel to feed said electrode toward and away from the work to strike and thereafter maintain a welding arc.

VERNI J. CHAPMAN.